(12) United States Patent
Mu

(10) Patent No.: US 12,513,550 B2
(45) Date of Patent: Dec. 30, 2025

(54) COMMUNICATION METHOD, COMMUNICATION APPARATUS, AND STORAGE MEDIUM

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 398 days.

(21) Appl. No.: 18/013,630

(22) PCT Filed: Jul. 6, 2020

(86) PCT No.: PCT/CN2020/100499
§ 371 (c)(1),
(2) Date: Dec. 29, 2022

(87) PCT Pub. No.: WO2022/006721
PCT Pub. Date: Jan. 13, 2022

(65) Prior Publication Data
US 2023/0319615 A1 Oct. 5, 2023

(51) Int. Cl.
H04W 24/10 (2009.01)
H04B 17/318 (2015.01)
H04W 48/02 (2009.01)

(52) U.S. Cl.
CPC .......... *H04W 24/10* (2013.01); *H04B 17/328* (2023.05); *H04W 48/02* (2013.01)

(58) Field of Classification Search
CPC ...... H04B 17/328; H04W 8/24; H04W 24/10; H04W 48/02; H04W 48/16
See application file for complete search history.

(56) References Cited

U.S. PATENT DOCUMENTS

2019/0281632 A1* 9/2019 Sha ................... H04W 74/0833
2020/0396654 A1* 12/2020 Freda ................ H04W 36/0061

FOREIGN PATENT DOCUMENTS

CN 107734597 A 2/2018

OTHER PUBLICATIONS

PCT/CN2020/100499, English translation of International Search Report dated Mar. 24, 2021, 2 pages.
Asustek "Consideration on dedicated RAN parameters" 3GPP TSG-RAN W2 Meeting #85,R2-140332, Feb. 2014, 3 pages.

* cited by examiner

Primary Examiner — Brian P Cox
(74) Attorney, Agent, or Firm — Cozen O'Connor

(57) ABSTRACT

A communication method performed by a network device includes: determining an offset of a communication parameter and a threshold of the communication parameter; and sending the offset of the communication parameter and the threshold of the communication parameter. A communication method performed by a terminal includes: acquiring an offset of a communication parameter and a threshold of the communication parameter; and conducting communication based on a measurement value of the communication parameter, the offset of the communication parameter, and the threshold of the communication parameter. A communication apparatus is also provided.

17 Claims, 7 Drawing Sheets

200

300

400

COMMUNICATION METHOD, COMMUNICATION APPARATUS, AND STORAGE MEDIUM

CROSS-REFERENCE TO RELATED APPLICATIONS

The present application is a U.S. National Stage of International Application No. PCT/CN2020/100499, filed on Jul. 6, 2020, the contents of which are incorporated herein by reference in their entireties for all purposes.

BACKGROUND

With the continued development of Internet of Things, services such as video surveillance, intelligent home, wearable devices, industrial sensor monitoring, have become more and more popular. These services typically require a speed of 10 s to 100 s M, and have relatively high requirements for delay.

SUMMARY

The present disclosure relates to the field of communication technologies, and in particular, to a communication method, a communication apparatus, and a storage medium.

In order to overcome the problems existing in the related art, the present disclosure provides a communication method, a communication apparatus, and a storage medium.

According to a first aspect of embodiments of the present disclosure, a communication method is provided, applied to a network device, the communication method including: determining a threshold of a communication parameter, the threshold including a first threshold and a second threshold, and the first threshold being different from the second threshold; and sending the threshold of the communication parameter.

In an implementation, the first threshold corresponds to a first-type terminal, and the second threshold corresponds to a second-type terminal.

In an implementation, a capability of the first-type terminal is lower than a capability of the second-type terminal; and the first threshold is less than the second threshold.

In an implementation, the capability includes one or more of a terminal transceiver bandwidth, a number of transceiver antennas, a maximum number of bits in a transport block, and a processing time delay.

In an implementation, the communication parameter includes reference signal received power (RSRP).

In an implementation, determining a threshold of a communication parameter includes: determining the threshold of the communication parameter based on configuration information of remaining minimum system information (RMSI).

According to a second aspect of embodiments of the present disclosure, a communication method is provided, applied to a terminal, the communication method including: acquiring a threshold of a communication parameter, the threshold including a first threshold, the first threshold being different from a second threshold, the first threshold corresponding to a first-type terminal, and the second threshold corresponding to a second-type terminal; and conducting communication based on a measurement value of the communication parameter and the threshold of the communication parameter.

In an implementation, a capability of the first-type terminal is lower than a capability of the second-type terminal; and the first threshold is less than the second threshold.

In an implementation, the capability includes one or more of a terminal transceiver bandwidth, a number of transceiver antennas, a maximum number of bits in a transport block, and a processing time delay.

In an implementation, conducting communication based on a measurement value of the communication parameter and the threshold of the communication parameter includes: determining that the first-type terminal is prohibited from accessing a network in case that the measurement value of the communication parameter is less than the threshold of the communication parameter; and determining that the first-type terminal is allowed to access the network in case that the measurement value of the communication parameter is greater than the threshold of the communication parameter.

In an implementation, the communication parameter includes RSRP.

In an implementation, acquiring a threshold of a communication parameter includes: acquiring the threshold of the communication parameter through configuration information of RMSI, the configuration information of the RMSI including the threshold of the communication parameter.

According to a third aspect of embodiments of the present disclosure, a communication method is provided, applied to a network device, the communication method including: determining an offset of a communication parameter and a threshold of the communication parameter; and sending the offset of the communication parameter and the threshold of the communication parameter.

In an implementation, the offset of the communication parameter corresponds to a first-type terminal, and the threshold of the communication parameter corresponds to a second-type terminal; and the offset of the communication parameter is determined based on a minimum communication parameter measurement value of the first-type terminal allowed to access the network device, the minimum communication parameter measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, determining an offset of a communication parameter and a threshold of the communication parameter includes: determining the offset of the communication parameter and the threshold of the communication parameter through configuration information of RMSI, the configuration information of the RMSI including an offset information field used to indicate the offset of the communication parameter.

According to a fourth aspect of embodiments of the present disclosure, a communication method is provided, applied to a terminal, the communication method including: acquiring an offset of a communication parameter and a threshold of the communication parameter; and conducting communication based on a measurement value of the communication parameter, the offset of the communication parameter, and the threshold of the communication parameter.

In an implementation, the offset of the communication parameter corresponds to a first-type terminal, and the threshold of the communication parameter corresponds to a second-type terminal; and the offset of the communication parameter is determined based on a minimum communication parameter measurement value of the first-type terminal allowed to access a network device, the minimum communication parameter measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, conducting communication based on a measurement value of the communication parameter, the offset of the communication parameter, and the threshold of the communication parameter includes: determining that the terminal is prohibited from accessing a network in case that a sum of the measurement value of the communication parameter and the offset of the communication parameter is less than the threshold of the communication parameter; and determining that the terminal is allowed to access the network in case that the sum of the measurement value of the communication parameter and the offset of the communication parameter is greater than the threshold of the communication parameter.

In an implementation, the communication parameter includes RSRP.

In an implementation, acquiring an offset of a communication parameter includes: acquiring the offset of the communication parameter through configuration information of RMSI, the configuration information of the RMSI including an offset information field used to indicate the offset of the communication parameter.

According to a fifth aspect of embodiments of the present disclosure, a communication method is provided, applied to a network device, the communication method including: determining a merging parameter value of a measurement value of a communication parameter and a threshold of the communication parameter, the merging parameter value being used to determine, by a terminal, a measurement resource; and sending the merging parameter value and the threshold of the communication parameter.

In an implementation, the merging parameter value corresponds to a first-type terminal, and the threshold of the communication parameter corresponds to a second-type terminal; and the merging parameter value is determined based on an average measurement value of the first-type terminal allowed to access the network device, the average measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the merging parameter value is carried by configuration information of RMSI; or the merging parameter value is predefined.

According to a sixth aspect of embodiments of the present disclosure, a communication method is provided, applied to a terminal, the communication method including: acquiring a threshold of a communication parameter and a merging parameter value of a measurement value of the communication parameter; determining a measurement resource according to the merging parameter value, and merging measurement values on the measurement resource; and conducting communication based on a merged measurement value and the threshold of the communication parameter.

In an implementation, the merging parameter value corresponds to a first-type terminal, and the threshold of the communication parameter corresponds to a second-type terminal; and the merging parameter value is determined based on an average measurement value of the first-type terminal allowed to access a network device, the average measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, conducting communication based on a merged measurement value and the threshold of the communication parameter includes: determining that the first-type terminal is prohibited from accessing a network in case that the merged measurement value is less than the threshold of the communication parameter; and determining that the first-type terminal is allowed to access the network in case that the merged measurement value is greater than the threshold of the communication parameter.

In an implementation, the communication parameter includes RSRP.

In an implementation, the merging parameter value is carried by configuration information of RMSI; or the merging parameter value is predefined.

According to a seventh aspect of embodiments of the present disclosure, a communication apparatus is provided, applied to a network device, the communication apparatus including: a processing unit configured to configure a threshold of a communication parameter, the threshold including a first threshold and a second threshold, and the first threshold being different from the second threshold; and a sending unit configured to send the threshold of the communication parameter.

In an implementation, the first threshold corresponds to a first-type terminal, and the second threshold corresponds to a second-type terminal.

In an implementation, a capability of the first-type terminal is lower than a capability of the second-type terminal; and the first threshold is less than the second threshold.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the processing unit is configured to configure the threshold of the communication parameter based on configuration information of RMSI.

According to an eighth aspect of embodiments of the present disclosure, a communication apparatus is provided, applied to a terminal, the communication apparatus including: an acquisition unit configured to acquire a threshold of a communication parameter, the threshold including a first threshold, the first threshold being different from a second threshold, the first threshold corresponding to a first-type terminal, and the second threshold corresponding to a second-type terminal; and a processing unit configured to conduct communication based on a measurement value of the communication parameter and the threshold of the communication parameter.

In an implementation, a capability of the first-type terminal is lower than a capability of the second-type terminal; and the first threshold is less than the second threshold.

In an implementation, the capability includes one or more of a terminal transceiver bandwidth, a number of transceiver antennas, a maximum number of bits in a transport block, and a processing time delay.

In an implementation, the processing unit is configured to determine that the first-type terminal is prohibited from accessing a network in case that the measurement value of the communication parameter is less than the threshold of the communication parameter; and determine that the first-type terminal is allowed to access the network in case that the measurement value of the communication parameter is greater than the threshold of the communication parameter.

In an implementation, the communication parameter includes RSRP.

In an implementation, the acquisition unit acquires the threshold of the communication parameter through configuration information of RMSI, the configuration information of the RMSI including the threshold of the communication parameter.

According to a ninth aspect of embodiments of the present disclosure, a communication apparatus is provided, applied to a network device, the communication apparatus including: a processing unit configured to determine an offset of a communication parameter and a threshold of the communication parameter; and a sending unit configured to send the offset of the communication parameter and the threshold of the communication parameter.

In an implementation, the offset of the communication parameter corresponds to a first-type terminal, and the threshold of the communication parameter corresponds to a second-type terminal; and the offset of the communication parameter is determined based on a minimum communication parameter measurement value of the first-type terminal allowed to access the network device, the minimum communication parameter measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the processing unit is configured to determine the offset of the communication parameter and the threshold of the communication parameter through configuration information of RMSI, the configuration information of the RMSI including an offset information field used to indicate the offset of the communication parameter.

According to a tenth aspect of embodiments of the present disclosure, a communication apparatus is provided, applied to a terminal, the communication apparatus including: an acquisition unit configured to acquire an offset of a communication parameter and a threshold of the communication parameter; and a processing unit configured to conduct communication based on a measurement value of the communication parameter, the offset of the communication parameter, and the threshold of the communication parameter.

In an implementation, the offset of the communication parameter corresponds to a first-type terminal, and the threshold of the communication parameter corresponds to a second-type terminal; and the offset of the communication parameter is determined based on a minimum communication parameter measurement value of the first-type terminal allowed to access a network device, the minimum communication parameter measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the processing unit conducts communication based on a measurement value of the communication parameter, the offset of the communication parameter, and the threshold of the communication parameter in a following manner: determining that the terminal is prohibited from accessing a network in case that a sum of the measurement value of the communication parameter and the offset of the communication parameter is less than the threshold of the communication parameter; and determining that the terminal is allowed to access the network in case that the sum of the measurement value of the communication parameter and the offset of the communication parameter is greater than the threshold of the communication parameter.

In an implementation, the communication parameter includes RSRP.

In an implementation, the acquisition unit acquires the offset of the communication parameter through configuration information of RMSI, the configuration information of the RMSI including an offset information field used to indicate the offset of the communication parameter.

According to an eleventh aspect of embodiments of the present disclosure, a communication apparatus is provided, applied to a network device, the communication apparatus including: a processing unit configured to determine a merging parameter value of a measurement value of a communication parameter and a threshold of the communication parameter, the merging parameter value being used to determine, by a terminal, a measurement resource; and a sending unit configured to send the merging parameter value and the threshold of the communication parameter.

In an implementation, the merging parameter value corresponds to a first-type terminal, and the threshold of the communication parameter corresponds to a second-type terminal; and the merging parameter value is determined based on an average measurement value of the first-type terminal allowed to access the network device, the average measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the merging parameter value is carried by configuration information of RMSI; or the merging parameter value is predefined.

According to a twelfth aspect of embodiments of the present disclosure, a communication apparatus is provided, applied to a terminal, the communication apparatus including: an acquisition unit configured to acquire a threshold of a communication parameter and a merging parameter value of a measurement value of the communication parameter; and a processing unit configured to determine a measurement resource according to the merging parameter value, merge measurement values on the measurement resource, and conduct communication based on a merged measurement value and the threshold of the communication parameter.

In an implementation, the merging parameter value corresponds to a first-type terminal, and the threshold of the communication parameter corresponds to a second-type terminal; and the merging parameter value is determined based on an average measurement value of the first-type terminal allowed to access a network device, the average measurement value being configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the processing unit is configured to conduct communication based on a merged measurement value and the threshold of the communication parameter in a following manner: determining that the first-type terminal is prohibited from accessing a network in case that the merged measurement value is less than the threshold of the communication parameter; and determining that the first-type terminal is allowed to access the network in case that the merged measurement value is greater than the threshold of the communication parameter.

In an implementation, the communication parameter includes RSRP.

In an implementation, the merging parameter value is carried by configuration information of RMSI; or the merging parameter value is predefined.

According to a thirteenth aspect of embodiments of the present disclosure, a communication apparatus is provided, including: a processor; and a memory configured to store processor-executable instructions; in which the processor is configured to perform the communication method according to the first aspect or any one of the implementations of the first aspect.

According to a fourteenth aspect of embodiments of the present disclosure, a communication apparatus is provided, including: a processor; and a memory configured to store processor-executable instructions; in which the processor is configured to perform the communication method according to the second aspect or any one of the implementations of the second aspect.

According to a fifteenth aspect of embodiments of the present disclosure, a communication apparatus is provided, including: a processor; and a memory configured to store processor-executable instructions; in which the processor is configured to perform the communication method according to the third aspect or any one of the implementations of the third aspect.

According to a sixteenth aspect of embodiments of the present disclosure, a communication apparatus is provided, including: a processor; and a memory configured to store processor-executable instructions; in which the processor is configured to perform the communication method according to the fourth aspect or any one of the implementations of the fourth aspect.

According to a seventeenth aspect of embodiments of the present disclosure, a communication apparatus is provided, including: a processor; and a memory configured to store processor-executable instructions; in which the processor is configured to perform the communication method according to the fifth aspect or any one of the implementations of the fifth aspect.

According to an eighteenth aspect of embodiments of the present disclosure, a communication apparatus is provided, including: a processor; and a memory configured to store processor-executable instructions; in which the processor is configured to perform the communication method according to the sixth aspect or any one of the implementations of the sixth aspect.

According to a nineteenth aspect of embodiments of the present disclosure, a non-transitory computer-readable storage medium is provided, instructions in the storage medium, when executed by a processor, enable the processor to perform the communication method according to the first aspect or any one of the implementations of the first aspect.

According to a twentieth aspect of embodiments of the present disclosure, a non-transitory computer-readable storage medium is provided, instructions in the storage medium, when executed by a processor, enable the processor to perform the communication method according to the second aspect or any one of the implementations of the second aspect.

According to a twenty-first aspect of embodiments of the present disclosure, a non-transitory computer-readable storage medium is provided, instructions in the storage medium, when executed by a processor, enable the processor to perform the communication method according to the third aspect or any one of the implementations of the third aspect.

According to a twenty-second aspect of embodiments of the present disclosure, a non-transitory computer-readable storage medium is provided, instructions in the storage medium, when executed by a processor, enable the processor to perform the communication method according to the fourth aspect or any one of the implementations of the fourth aspect.

According to a twenty-third aspect of embodiments of the present disclosure, a non-transitory computer-readable storage medium is provided, instructions in the storage medium, when executed by a processor, enable the processor to perform the communication method according to the fifth aspect or any one of the implementations of the fifth aspect.

According to a twenty-fourth aspect of embodiments of the present disclosure, a non-transitory computer-readable storage medium is provided, instructions in the storage medium, when executed by a processor, enable the processor to perform the communication method according to the sixth aspect or any one of the implementations of the sixth aspect.

The technical solutions according to embodiments of the present disclosure may include the following beneficial effects. By configuring the threshold of the communication parameter including different thresholds, or configuring the offset of the communication parameter and the threshold of the communication parameter, or configuring the merging parameter value of the measurement value of the communication parameter, the terminal can determine the measurement resource, so as to provide different communication parameter threshold communication mechanisms to improve a probability of successful access of different types of terminals to a cell.

It is to be understood that the general description above and the detailed description in the following are merely exemplary and illustrative, and cannot limit the present disclosure.

BRIEF DESCRIPTION OF THE DRAWINGS

The accompanying drawings herein, which are incorporated in and constitute a part of the specification, illustrate embodiments consistent with the present disclosure and, together with the specification, serve to explain the principles of the present disclosure.

DETAILED DESCRIPTION

Illustrative embodiments will be described in detail herein, examples of which are shown in the accompanying drawings. When the following description relates to the accompanying drawings, unless otherwise specified, identical numbers in different accompanying drawings denote identical or similar elements. Implementations described in the following illustrative embodiments do not represent all implementations consistent with the present disclosure. Instead, they are merely examples of apparatuses and methods consistent with some aspects of the present disclosure as recited in the appended claims.

With the continuous development of Internet of Things services, such as popularity of video surveillance, intelligent home, wearable devices, industrial sensor monitoring, and other services, these services generally require a rate of tens to 100 M, and have relatively high requirements for delay. Therefore, machine type communication (MTC) and narrow band Internet of thing (NB-IoT) technologies in the related art can hardly meet the requirements. Therefore, a requirement of designing a new terminal type in 5G new radio (NR) to cover mid-end IoT devices is put forward. In current 3GPP standardization, the new terminal type is called reduced capability UE or NR-lite for short.

The NR-lite has worse receiving and transmitting capabilities than a normal NR terminal due to limitations of forms and transceiver antennas. If the NR-lite terminal and the normal NR terminal use a same communication parameter threshold, for example, a reference signal received power threshold (RSRP-Threshold) synchronization signal and PBCH block (SSB), many NR-lite terminals cannot conduct communication, such as access to a cell, affecting the experience.

Figure 1:
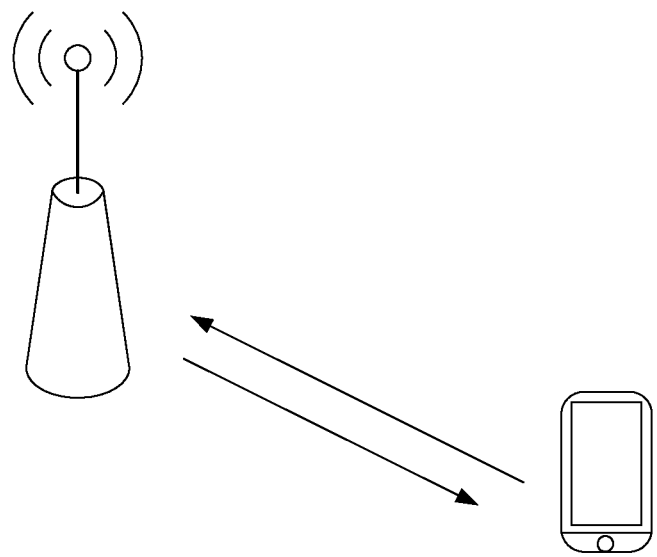
FIG. 1 is a schematic architectural diagram of a wireless communication system according to an embodiment.

An access method according to an embodiment of the present disclosure is applicable to a wireless communication system shown in FIG. 1. Referring to FIG. 1, the wireless communication system includes a terminal and a network device. Information is sent and received between the terminal and the network device through wireless resources.

It may be understood that the wireless communication system shown in FIG. 1 is merely illustrative, and the wireless communication system may further include other network devices, for example, it may further include a core network device, a wireless relay device, and a wireless backhaul device that are not depicted in FIG. 1. Numbers of the network devices and the terminals included in the wireless communication system are not limited in embodiments of the present disclosure.

It may be further understood that the wireless communication system in embodiments of the present disclosure is a network that provides a wireless communication function. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (single Carrier FDMA, SC-FDMA), and carrier sense multiple access with collision avoidance. Networks may be classified into a 2G (generation) network, a 3G network, a 4G network, or a future evolved network such as a 5G network based on factors such as capacities, rates, or delays of different networks. The 5G network may also be referred to as a New Radio (NR) network. For the convenience of description, the wireless communication network may sometimes be referred to as a network for short in the present disclosure.

Further, the network device in the present disclosure may also be referred to as a wireless access network device. The wireless access network device may be: a base station, an evolved node B (base station), a home base station, an access point (AP) of a wireless fidelity (WIFI) system, a wireless relay node, a wireless backhaul node, a transmission point (TP), or a transmission and reception point (TRP), or a gNB in an NR system, or may also be a component or part of a device constituting the base station. When being a vehicle to everything (V2X) communication system, the network device may also be a vehicle-mounted device. It should be understood that the specific technology and specific device form adopted by the network device are not limited in embodiments of the present disclosure.

Further, the terminal in the present disclosure may also be referred to as a terminal device, a user equipment (UE), a mobile station (MS), a mobile terminal (MT), which is a device that provides a user with voice and/or data connectivity. For example, the terminal may be a handheld device or a vehicle-mounted device having a wireless connection function. Currently, some examples of the terminal may be a mobile phone, a pocket personal computer (PPC), a handheld computer, a personal digital assistant (PDA), a notebook computer, a tablet computer, a wearable device, or a vehicle-mounted device. In addition, when being a V2X communication system, the terminal device may also be a vehicle-mounted device. It should be understood that the specific technology and specific device form adopted by the terminal are not limited in embodiments of the present disclosure.

The terminal as referred to in embodiments of the present disclosure may be understood as the new terminal type designed in the 5G NR: reduced capability UE or NR-lite for short. In embodiments of the present disclosure, the new terminal is referred to as 5G NR-lite.

Similar to Internet of Thing (IoT) devices in Long Term Evolution (LTE), the 5G NR-lite is generally required to meet the following requirements:

low costs, low complexity;

a certain extent of coverage enhancement;

power saving.

A current NR system is designed for high-end terminals such as high-speed and low-delay terminals. Therefore, the current design cannot meet the above requirements of the NR-Lite. Therefore, the current NR system is required to be transformed to meet the requirements of the NR-Lite. For example, in order to meet the requirements such as low costs and low complexity, a radio frequency (RF) bandwidth of NR-IoT may be limited to, for example, 5 MHz or 10 MHz, or a size of the NR-lite's buffer is limited, to limit a size of a transport block received each time, and so on. For the power saving, a possible optimization direction is to simplify a communication process, reduce a number of times the NR-lite terminal detects a downlink control channel, etc.

In the related art, there is a communication process based on a threshold of a communication parameter. For example, when beam recovery is required for random access or beam failure of the terminal, the terminal is required to compare a measured layer1 reference signal received power (L1-RSRP) parameter based on a Synchronization Signal and PBCH block (SSB) with an RSRP-Threshold SSB configured in the system, to determine whether an access requirement is met. The terminal is allowed to use a beam of the SSB as a candidate beam and a random access resource corresponding to the SSB to access a cell only when a measurement value of L1-RSRP is greater than the RSRP-Threshold.

However, in the related art, all types of terminals use a same communication parameter threshold communication mechanism. The NR-lite has worse receiving and transmitting capabilities than a normal NR terminal due to limitations of forms and transceiver antennas. If the NR-lite and the normal NR terminal use a same RSRP-Threshold SSB, many NR-lite terminals cannot access the cell, affecting the experience.

In view of this, in the embodiments of the present disclosure, different communication parameter threshold communication mechanisms are provided to improve the probability of successful access of different types of terminals to the cell.

In an implementation, an embodiment of the present disclosure provides a communication method, in which a threshold of a communication parameter including different thresholds is configured. In embodiments of the present disclosure, for case of description, different thresholds corresponding to the communication parameter are referred to as a first threshold and a second threshold.

Figure 2:
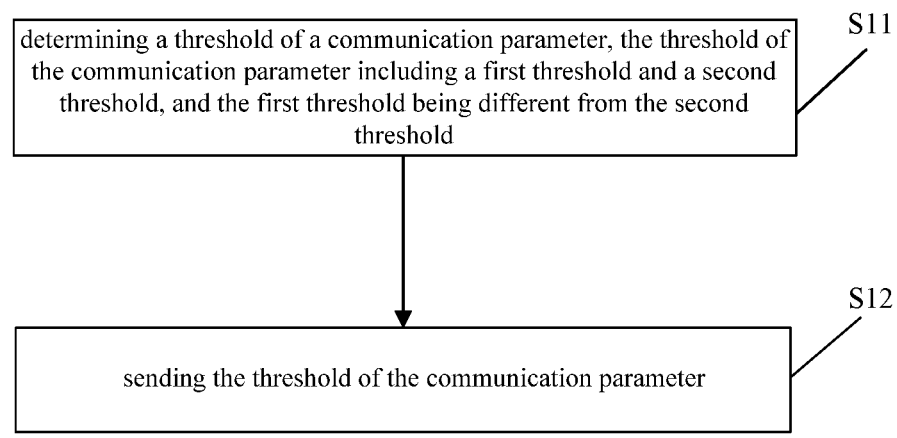
FIG. 2 is a flowchart of a communication method according to an embodiment.

FIG. 2 is a flowchart of a communication method according to an embodiment. As shown in FIG. 2, the communication method is applied to a network device, including the following steps:

In step S11: a threshold of a communication parameter is determined, the threshold of the communication parameter including a first threshold and a second threshold, and the first threshold being different from the second threshold.

In step S12: the threshold of the communication parameter is sent.

In embodiments of the present disclosure, at least two thresholds are configured for the communication parameter. Any two thresholds of the at least two thresholds may be understood as a first threshold and a second threshold. Differentiated communication requirements may be provided by configuring different thresholds for a same communication parameter.

In an example, the first threshold is different from the second threshold. That is, the first threshold may be less than the second threshold, or the first threshold may be greater than the second threshold.

In an implementation of embodiments of the present disclosure, the threshold of the communication parameter is configured based on a terminal type. In an example, in embodiments of the present disclosure, different thresholds are configured for different terminal types. Certainly, if different terminal types have a same communication requirement, a same threshold may be configured for different terminal types. This is not limited in embodiments of the present disclosure. The following embodiments are described with an example in which different thresholds are configured for different terminal types.

For ease of description, one of any two types of terminals of different types is called a first-type terminal, and the other is called a second-type terminal. When the threshold of the communication parameter is configured, the first threshold corresponds to the first-type terminal, and the second threshold corresponds to the second-type terminal.

In embodiments of the present disclosure, the threshold of the communication parameter is determined based on a terminal type, and a terminal may conduct communication based on a communication parameter matching a current terminal type. Different types of terminals correspond to different thresholds, which can ensure that terminals with different capabilities conduct communication through their respective communication parameter thresholds to improve a success rate of communication access.

Different types of terminals have different capabilities. For example, the capabilities of the terminals may be a transceiver bandwidth, a number of transceiver antennas, a maximum number of bits in a transport block, and a processing time delay. The capabilities of the terminals are different in that one or more of the transceiver bandwidth, the number of transceiver antennas, the maximum number of bits in the transport block, and the processing time delay is/are different.

In an implementation of embodiments of the present disclosure, the threshold of the communication parameter may be configured based on a capability of a terminal. In an example, in embodiments of the present disclosure, different thresholds are configured for terminals with different capabilities. Certainly, a same threshold may also be configured for the terminals with different capabilities, which is not limited in embodiments of the present disclosure. The following description is based on an example in which different thresholds are configured for terminals with different capabilities.

In an implementation of embodiments of the present disclosure, a low threshold is configured for the terminal with a low capability, and a high threshold is configured for the terminal with a high capability. For example, a capability of the first-type terminal is lower than a capability of the second-type terminal, and the first threshold corresponding to the first-type terminal is less than the second threshold corresponding to the second-type terminal. In an example, the first-type terminal may be an NR lite, and the second-type terminal may be an NR terminal.

"A capability of the first-type terminal is lower than a capability of the second-type terminal" may be understood as that one or more of a transceiver bandwidth, a number of transceiver antennas, a maximum number of bits in the transport block, and a processing time delay of the first-type terminal is/are lower than the respective capabilities of the second-type terminal.

The communication parameter as referred to in embodiments of the present disclosure may be RSRP. A threshold of the RSRP may include a first RSRP threshold and a second RSRP threshold. For example, the threshold of the RSRP may include a first RSRP-Threshold SSB and a second RSRP-Threshold SSB.

In embodiments of the present disclosure, when the threshold of the communication parameter is configured, it may be configured based on remaining minimum system information (RMSI). For example, configuration is performed for the threshold of the communication parameter in configuration information of the RMSI.

In an example, in the configuration information of the RMSI, an independent RSRP-Threshold SSB parameter value is configured for the NR-lite. For example, the RSRP-Threshold SSB parameter value configured for the NR-lite is less than the RSRP-Threshold SSB parameter value configured for the normal NR terminal.

In embodiments of the present disclosure, the terminal, when conducting communication, acquires the threshold of the communication parameter, and conducts communication based on the acquired threshold of the communication parameter.

Figure 3:
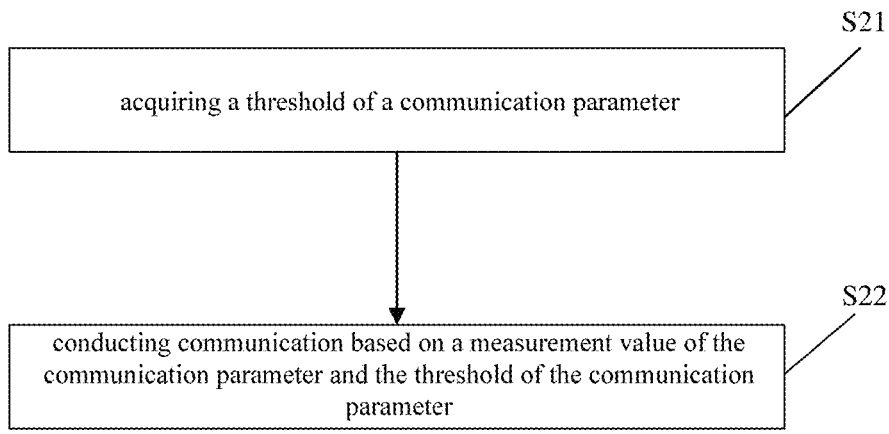
FIG. 3 is a flowchart of a communication method according to an embodiment.

FIG. 3 is a flowchart of a communication method according to an embodiment. As shown in FIG. 3, the communication method is applied to a terminal, including the following steps:

In step S21: a threshold of a communication parameter is acquired.

In an example, different thresholds of the communication parameter are acquired for different types of terminals. For example, a threshold of a communication parameter acquired for a first-type terminal includes a first threshold, the first threshold is different from a second threshold, the first threshold corresponds to the first-type terminal, and the second threshold corresponds to a second-type terminal.

For example, the threshold of the communication parameter acquired for the second-type terminal includes the second threshold, and the second threshold is different from the first threshold. The first threshold corresponds to the first-type terminal, and the second threshold corresponds to the second-type terminal.

In an example of the present disclosure, a capability of the first-type terminal is lower than a capability of the second-type terminal, and the first threshold corresponding to the first-type terminal is less than the second threshold corresponding to the second-type terminal. In an example, the first-type terminal may be an NR lite, and the second-type terminal may be an NR terminal.

"A capability of the first-type terminal is lower than a capability of the second-type terminal" may be understood as that one or more of a transceiver bandwidth, a number of transceiver antennas, a maximum number of bits in the transport block, and a processing time delay of the first-type terminal is/are lower than the respective capabilities of the second-type terminal.

The communication parameter as referred to in embodiments of the present disclosure may be RSRP. A threshold of the RSRP may include a first RSRP threshold and a second RSRP threshold. For example, the threshold of the RSRP may include a first RSRP-Threshold SSB and a second RSRP-Threshold SSB. The threshold of the RSRP acquired by the first-type terminal may include a first RSRP threshold.

In embodiments of the present disclosure, the terminal may acquire the threshold of the communication parameter through RMSI. For example, configuration information of the RMSI includes the threshold of the communication parameter.

In an example, in the configuration information of the RMSI, an independent RSRP-Threshold SSB parameter value is configured for the NR-lite. For example, the RSRP-Threshold SSB parameter value configured for the NR-lite is less than the RSRP-Threshold SSB parameter value configured for the normal NR terminal. The NR-lite acquires the independent RSRP-Threshold SSB parameter value configured for the NR-lite.

In step S22: communication is conducted based on a measurement value of the communication parameter and the threshold of the communication parameter.

In embodiments of the present disclosure, the terminal conducts communication based on the measurement value obtained by measuring the communication parameter and the acquired threshold of the communication parameter. In an example, it is determined that the first-type terminal is prohibited from accessing a network in case that the measurement value of the communication parameter is less than the threshold of the communication parameter. It is determined that the first-type terminal is allowed to access the network in case that the measurement value of the communication parameter is greater than the threshold of the communication parameter.

For example, the NR-lite acquires the independent RSRP-Threshold SSB parameter value configured for the NR-lite, and compares the measurement value with an RSRP-Threshold SSB parameter threshold to confirm whether access is allowed.

It may be understood that, in embodiments of the present disclosure, for the NR terminal, acquisition of the threshold of the communication parameter, comparison between the measurement value and the parameter threshold, and then a related communication processing may be performed in a conventional manner.

In another implementation, an embodiment of the present disclosure provides a communication method, in which an offset of a communication parameter and a threshold of the communication parameter are configured.

Figure 4:
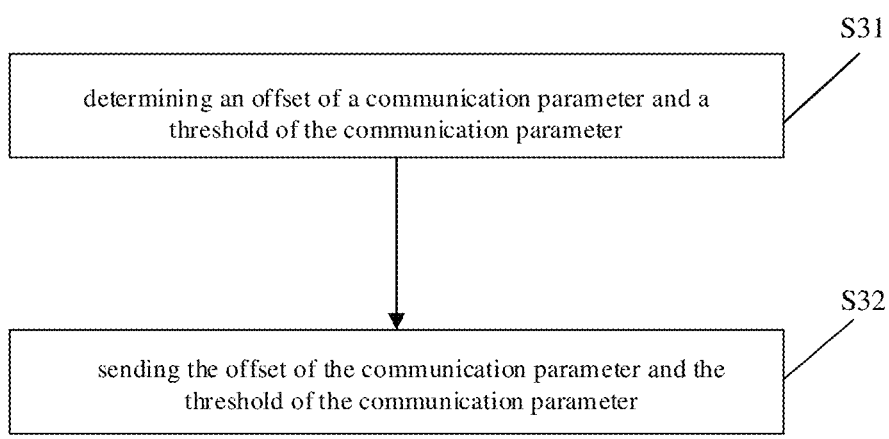
FIG. 4 is a flowchart of a communication method according to an embodiment.

FIG. 4 is a flowchart of a communication method according to an embodiment. As shown in FIG. 4, the communication method is applied to a network device, including the following steps:

In step S31: an offset of a communication parameter and a threshold of the communication parameter are determined.

In step S32: the offset of the communication parameter and the threshold of the communication parameter are sent.

In embodiments of the present disclosure, the offset of the communication parameter may be understood as a parameter value for a terminal to judge whether to perform communication access based on a measurement value of the communication parameter, and the threshold of the communication parameter and the offset of the communication parameter that are configured. For example, the terminal may add the offset of the communication parameter on the measurement value of the communication parameter for comparison with the threshold of the communication parameter, to determine whether to perform communication access. Certainly, alternatively, the terminal may compare the measurement value of the communication parameter with a new communication parameter value obtained after the offset of the communication parameter is subtracted from the threshold of the communication parameter, to determine whether to perform communication access.

Alternatively, the offset of the communication parameter may also be understood as a parameter value used to determine another threshold of the communication parameter different from the configured threshold of the communication parameter. For example, a new threshold of the communication parameter may be obtained by subtracting the offset of the communication parameter from the threshold of the communication parameter.

In an example, in embodiments of the present disclosure, different thresholds of the communication parameter are determined for different types of terminals. For example, the offset of the communication parameter is configured for the first-type terminal. That is, the offset of the communication parameter corresponds to the first-type terminal. The threshold of the communication parameter is configured for the second-type terminal. That is, the threshold of the communication parameter corresponds to the second-type terminal.

In the implementation of the present disclosure, the offset of the communication parameter is determined based on a minimum communication parameter measurement value of the first-type terminal allowed to access a network device, and the minimum communication parameter measurement value is configured by the network device.

The network device determines the threshold of the communication parameter based on the measurement value of the communication parameter of the terminal allowed to access. The offset of the communication parameter may be determined on the basis that the threshold of the communication parameter is determined and the minimum communication parameter measurement value of the terminal allowed to access is determined. The determined offset of the communication parameter meets that a sum of the minimum communication parameter measurement value of the terminal allowed to access and the offset of the communication parameter is greater than the threshold of the communication parameter.

In embodiments of the present disclosure, a capability of the first-type terminal is lower than a capability of the second-type terminal. In an example, the first-type terminal may be an NR lite, and the second-type terminal may be an NR terminal.

"A capability of the first-type terminal is lower than a capability of the second-type terminal" may be understood as that one or more of a transceiver bandwidth, a number of transceiver antennas, a maximum number of bits in the transport block, and a processing time delay of the first-type terminal is/are lower than the respective capabilities of the second-type terminal.

The communication parameter as referred to in embodiments of the present disclosure may be RSRP, and the determined threshold of the communication parameter may include an RSRP-Threshold SSB. The offset of the communication parameter may be understood as an offset with respect to the RSRP-Threshold SSB.

In embodiments of the present disclosure, the threshold of the communication parameter may be configured based on RMSI configuration. For example, an offset information field used to indicate an offset is configured in configuration information of RMSI.

In an example, an additional offset information field is configured for NR-lite users in the configuration information of the RMSI.

In the following, the first-type terminal, when conducting communication, judges whether to perform communication access based on the offset of the communication parameter and the threshold of the communication parameter that are acquired.

Figure 5:
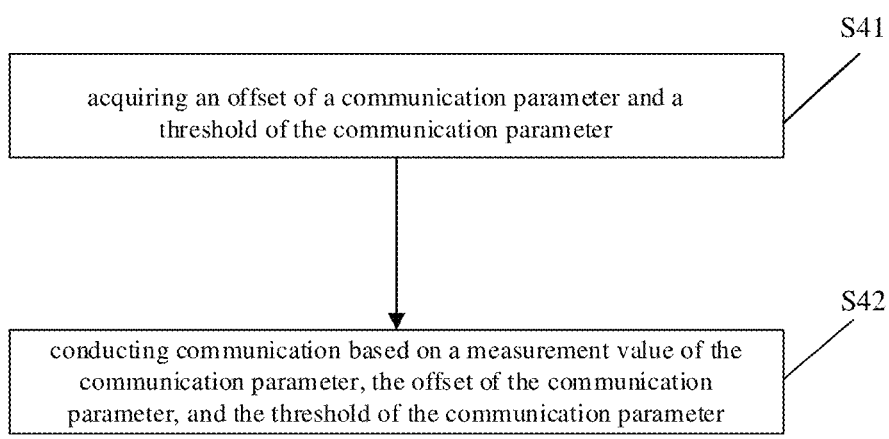
FIG. 5 is a flowchart of a communication method according to an embodiment.

FIG. 5 is a flowchart of a communication method according to an embodiment. As shown in FIG. 5, the communication method is applied to a terminal, including the following steps:

In step S41: an offset of a communication parameter and a threshold of the communication parameter are acquired.

In step S42: communication is conducted based on a measurement value of the communication parameter, the offset of the communication parameter, and the threshold of the communication parameter.

In embodiments of the present disclosure, the terminal judges whether to perform communication access based on the measurement value of the communication parameter, and the threshold of the communication parameter and the offset of the communication parameter that are configured. For example, the terminal may add the offset of the communication parameter on the measurement value of the communication parameter for comparison with the threshold of the communication parameter, to determine whether to perform communication access. Certainly, alternatively, the terminal may compare the measurement value of the communication parameter with a new communication parameter value obtained after the offset of the communication parameter is subtracted from the threshold of the communication parameter, to determine whether to perform communication access.

In an example, in embodiments of the present disclosure, the terminal may judge whether to perform communication access in the following manner: determining that the terminal is prohibited from accessing a network in case that a sum of the measurement value of the communication parameter and the offset of the communication parameter is less than the threshold of the communication parameter; and determining that the terminal is allowed to access the network in case that the sum of the measurement value of the communication parameter and the offset of the communication parameter is greater than the threshold of the communication parameter.

In embodiments of the present disclosure, the offset of the communication parameter corresponds to a first-type terminal, and the threshold of the communication parameter corresponds to a second-type terminal. The offset of the communication parameter is determined based on a minimum communication parameter measurement value of the first-type terminal allowed to access the network device. The minimum communication parameter measurement value is configured by the network device.

In an example, a capability of the first-type terminal is lower than a capability of the second-type terminal.

"A capability of the first-type terminal is lower than a capability of the second-type terminal" may be understood as that one or more of a transceiver bandwidth, a number of transceiver antennas, a maximum number of bits in the transport block, and a processing time delay of the first-type terminal is/are lower than the respective capabilities of the second-type terminal.

For example, the first-type terminal may be an NR lite, and the second-type terminal may be an NR terminal.

The communication parameter as referred to in embodiments of the present disclosure may be RSRP, and the threshold of the communication parameter may include an RSRP-Threshold SSB. The offset of the communication parameter may be understood as an offset with respect to the RSRP-Threshold SSB.

In embodiments of the present disclosure, the terminal may acquire the offset of the communication parameter through configuration information of RMSI. For example, an offset information field used to indicate an offset is configured in the configuration information of the RMSI. The terminal may determine the offset of the communication parameter through the offset information field of the configuration information of the RMSI.

In an example, an additional offset information field is configured for the NR-lite in the configuration information of the RMSI. The NR-lite first reads an RSRP-Threshold SSB parameter value in the RMSI, and on this basis adds an offset parameter value from an RMSI field. The NR-lite compares a measurement value of the RSRP with a calculated result to confirm whether to allow access.

In embodiments of the present disclosure, by configuring the threshold of the communication parameter and the offset of the communication parameter for different types of terminals, differentiated access possibilities may be provided for a plurality of types of terminals while an original communication parameter threshold is kept unchanged.

In another implementation of the present disclosure, an additional measurement resource may be configured for the terminal. In a manner, a merging parameter value of a measurement value of a communication parameter is configured, and the merging parameter value is used to determine by the terminal the measurement resource.

Figure 6:
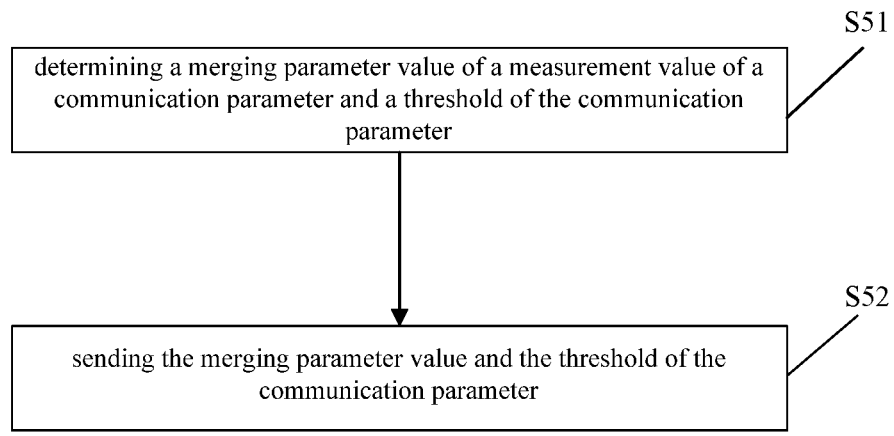
FIG. 6 is a flowchart of a communication method according to an embodiment.

FIG. 6 is a flowchart of a communication method according to an embodiment. As shown in FIG. 6, the communication method is applied to a network device, including the following steps:

In step S51: a merging parameter value of a measurement value of a communication parameter and a threshold of the communication parameter are determined.

In embodiments of the present disclosure, the merging parameter value may be understood as a parameter value used to determine by a terminal a measurement resource.

The terminal, after determining the measurement resource based on the merging parameter value, conducts communication according to a relationship between a merging measurement value of the measurement resource and the threshold of the communication parameter. The merging measurement value may be understood as a sum of measurement results of the measurement resource. For example, the merging parameter value may be addition of power corresponding to measurement values.

In an example, in embodiments of the present disclosure, the merging parameter value may be determined based on a terminal type. Further, the merging parameter value may be determined based on an average measurement value of the terminal allowed to access a network device on the measurement resource. That is, the merging parameter value is required to meet that an average measurement value of a merging measurement value of the measurement resource determined by the terminal according to the merging parameter value is greater than or equal to the average measurement value of the terminal allowed to access the network device.

In embodiments of the present disclosure, the merging parameter value corresponds to a first-type terminal, and the threshold of the communication parameter corresponds to a second-type terminal. The merging parameter value is determined based on an average measurement value of the first-type terminal allowed to access the network device. The average measurement value is configured by the network device.

In embodiments of the present disclosure, the first-type terminal may be understood as a terminal configured to judge whether to perform communication access based on the merging measurement value on the measurement resource determined by the merging parameter value. The second-type terminal may be understood as a terminal that uses the threshold of the communication parameter to judge whether to perform communication access.

In embodiments of the present disclosure, a capability of the first-type terminal is lower than a capability of the second-type terminal. "A capability of the first-type terminal is lower than a capability of the second-type terminal" may be understood as that one or more of a transceiver bandwidth, a number of transceiver antennas, a maximum number of bits in the transport block, and a processing time delay of the first-type terminal is/are lower than the respective capabilities of the second-type terminal.

In an example, the first-type terminal may be an NR lite, and the second-type terminal may be an NR terminal.

The communication parameter as referred to in embodiments of the present disclosure may be RSRP, and the determined threshold of the communication parameter may include an RSRP-Threshold SSB. The second-type terminal determines whether to access a network based on a comparison between a measurement value of the RSRP and the RSRP-Threshold SSB. The merging parameter value may be understood as a parameter value merging a plurality of RSRP-Threshold SSBs corresponding to the merging parameter value and used by the terminal to judge whether to perform network access.

In an example, the merging parameter value is carried by configuration information of RMSI; or the merging parameter value is predefined.

In an example of the present disclosure, an additional measurement resource is configured for the NR-lite (configured through the merging parameter value). For an ordinary NR terminal, an SSB-based RSRP measurement value is measured according to an SSB. For the NR-lite, addition of power of N RSRP SSB measurement values may be specified. A power value after the addition is compared with the RSRP-Threshold SSB in the RMSI to determine whether access is allowed.

In this method, the value of N may be specified in the RMSI or predefined in a protocol.

In step S52: the merging parameter value and the threshold of the communication parameter are sent.

In embodiments of the present disclosure, by configuring the merging parameter value and the threshold of the communication parameter, the terminal can determine the measurement resource based on the merging parameter value, merge measurement values on the measurement resource, and conduct communication based on a merged measurement value and the threshold of the communication parameter, which is conducive to tracking a channel state of the terminal.

Figure 7:
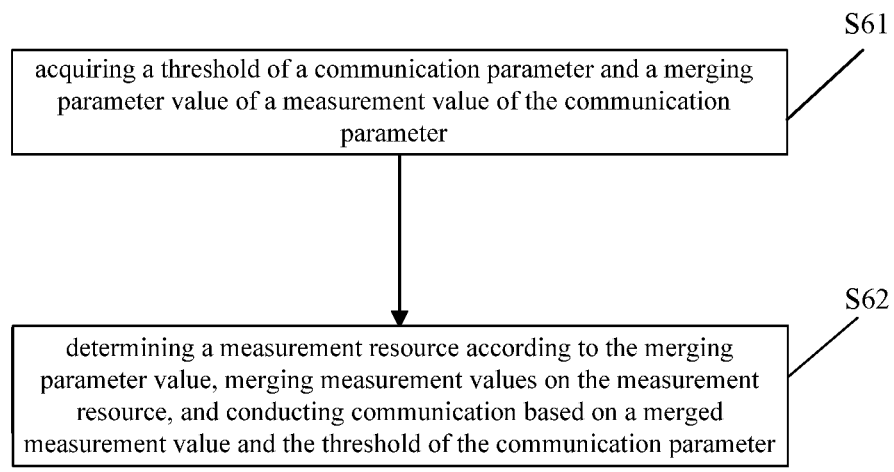
FIG. 7 is a flowchart of a communication method according to an embodiment.

FIG. 7 is a flowchart of a communication method according to an embodiment. As shown in FIG. 7, the communication method is applied to a terminal, including the following steps:

In step S61: a threshold of a communication parameter and a merging parameter value of a measurement value of the communication parameter are acquired.

In step S62: a measurement resource is determined according to the merging parameter value, measurement values on the measurement resource are merged, and communication is conducted based on a merged measurement value and the threshold of the communication parameter.

In embodiments of the present disclosure, the terminal, when conducting communication based on the merged measurement value and the threshold of the communication parameter, may determine whether to be allowed to access a network based on a comparison between the merged measurement value and the threshold of the communication parameter. In a manner, it is determined that the first-type terminal is prohibited from accessing the network in case that the merged measurement value is less than the threshold of the communication parameter. It is determined that the first-type terminal is allowed to access the network in case that the merged measurement value is greater than the threshold of the communication parameter.

In an example, in embodiments of the present disclosure, the merging parameter value may be determined based on a terminal type. Further, the merging parameter value may be determined based on an average measurement value of the terminal allowed to access a network device on the measurement resource. That is, the merging parameter value is required to meet that an average measurement value of a merging measurement value of the measurement resource determined by the terminal according to the merging parameter value is greater than or equal to the average measurement value of the terminal allowed to access the network device.

In embodiments of the present disclosure, the merging parameter value corresponds to a first-type terminal, and the threshold of the communication parameter corresponds to a second-type terminal. The merging parameter value is determined based on an average measurement value of the first-type terminal allowed to access the network device. The average measurement value is configured by the network device.

In embodiments of the present disclosure, a capability of the first-type terminal is lower than a capability of the second-type terminal. "A capability of the first-type terminal is lower than a capability of the second-type terminal" may be understood as that one or more of a transceiver bandwidth, a number of transceiver antennas, a maximum number of bits in the transport block, and a processing time delay of the first-type terminal is/are lower than the respective capabilities of the second-type terminal.

In an example, the first-type terminal may be an NR lite, and the second-type terminal may be an NR terminal.

The communication parameter as referred to in embodiments of the present disclosure may be RSRP, and the determined threshold of the communication parameter may include an RSRP-Threshold SSB. The second-type terminal determines whether to access a network based on a comparison between a measurement value of the RSRP and the RSRP-Threshold SSB. The merging parameter value may be understood as a parameter value merging a plurality of RSRP-Threshold SSBs corresponding to the merging parameter value and used by the terminal to judge whether to perform network access.

In an example, the merging parameter value is carried by configuration information of RMSI; or the merging parameter value is predefined.

In an example of the present disclosure, an additional measurement resource is configured for the NR-lite (configured through the merging parameter value). For an ordinary NR terminal, an SSB-based RSRP measurement value is measured according to an SSB. For the NR-lite, addition of power of N RSRP SSB measurement values may be specified. A power value after the addition is compared with the RSRP-Threshold SSB in the RMSI to determine whether access is allowed.

In this method, the value of N may be specified in the RMSI or predefined in a protocol.

Further, in embodiments of the present disclosure, when determining the measurement resource based on the merging parameter value, for example, determining N measurement resources, the terminal may determine N continuous measurement resources or N discontinuous measurement resources.

In embodiments of the present disclosure, by configuring the merging parameter value and the threshold of the communication parameter, the terminal can determine the measurement resource based on the merging parameter value, merge measurement values on the measurement resource, and conduct communication based on a merged measurement value and the threshold of the communication parameter, which is conducive to tracking a channel state of the terminal.

It may be understood that the communication method according to embodiments of the present disclosure may also be applied to a process of communication between the network device and the terminal based on the threshold of the communication parameter implemented by interaction. A specific implementation process may refer to the implementation process of communication processing on the side of the terminal or the side of the network as referred to in the above embodiment. Details are not described herein in embodiments of the present disclosure.

It is to be noted that those skilled in the art may understand that various implementations/embodiments as referred to above in the embodiments of the present disclosure may be used in combination with the foregoing embodiments or used separately. Whether they are used separately or in combination with the foregoing embodiments, implementation principles are similar. In implementations of the present disclosure, some embodiments are described with the implementations used together. Certainly, those skilled in the art may understand that such examples are not intended to limit the embodiments of the present disclosure. Based on the same concept, embodiments of the present disclosure further provide a communication apparatus.

It may be understood that, in order to implement the above functions, the communication apparatus according to embodiments of the present disclosure includes corresponding hardware structures and/or software modules for performing the functions. In combination with units and algorithm steps in the examples disclosed in the embodiments of the present disclosure, the embodiments of the present disclosure can be implemented using hardware or a combination of hardware and computer software. Whether a function is performed using hardware or hardware driven by computer software depends on particular applications and design constraints of the technical solutions. Those skilled in the art may use different methods to implement the described functions for each particular application, but it should not be considered that the implementation goes beyond the scope of the technical solutions of the embodiments of the present disclosure.

Figure 8:
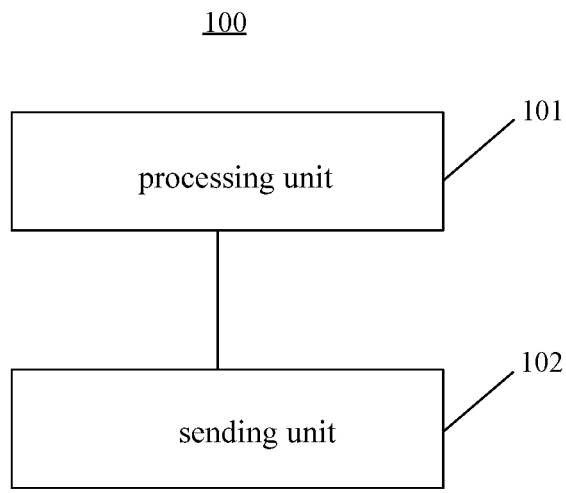
FIG. 8 is a block diagram of a communication apparatus according to an embodiment.

FIG. 8 is a block diagram of a communication apparatus according to an embodiment. Referring to FIG. 8, the communication apparatus 100 is applied to a network device, including a processing unit 101 and a sending unit 102.

The processing unit 101 is configured to configure a threshold of a communication parameter, the threshold includes a first threshold and a second threshold, and the first threshold is different from the second threshold. The sending unit is configured to send the threshold of the communication parameter.

In an implementation, the first threshold corresponds to a first-type terminal, and the second threshold corresponds to a second-type terminal.

In an implementation, a capability of the first-type terminal is lower than a capability of the second-type terminal. The first threshold is less than the second threshold.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the processing unit 101 is configured to configure the threshold of the communication parameter based on configuration information of RMSI.

Figure 9:
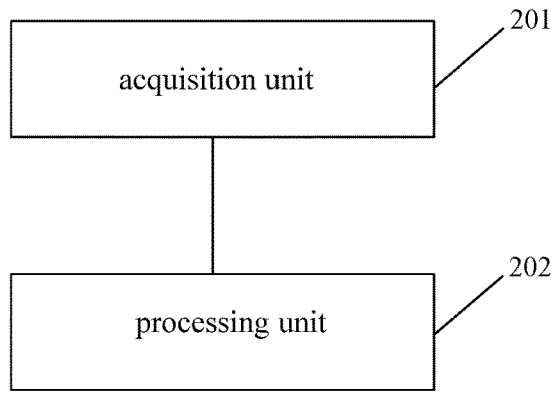
FIG. 9 is a block diagram of a communication apparatus according to an embodiment.

FIG. 9 is a block diagram of a communication apparatus according to an embodiment. Referring to FIG. 9, the communication apparatus 200 is applied to a terminal, including an acquisition unit 201 and a processing unit 202.

The acquisition unit 201 is configured to acquire a threshold of a communication parameter, the threshold includes a first threshold, the first threshold is different from a second threshold, the first threshold corresponds to a first-type terminal, and the second threshold corresponds to a second-type terminal. The processing unit 202 is configured to conduct communication based on a measurement value of the communication parameter and the threshold of the communication parameter.

In an implementation, a capability of the first-type terminal is lower than a capability of the second-type terminal. The first threshold is less than the second threshold.

In an implementation, the capability includes one or more of a terminal transceiver bandwidth, a number of transceiver antennas, a maximum number of bits in a transport block, and a processing time delay.

In an implementation, the processing unit 202 is configured to: determine that the first-type terminal is prohibited from accessing a network in case that the measurement value of the communication parameter is less than the threshold of the communication parameter; and determine that the first-type terminal is allowed to access the network in case that the measurement value of the communication parameter is greater than the threshold of the communication parameter.

In an implementation, the communication parameter includes RSRP.

In an implementation, the acquisition unit 201 acquires the threshold of the communication parameter through configuration information of RMSI, and the configuration information of the RMSI includes the threshold of the communication parameter.

Figure 10:
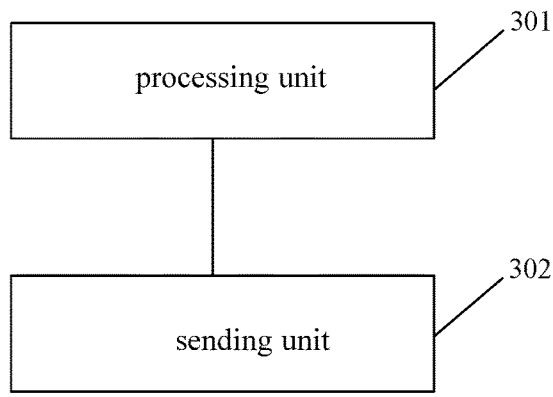
FIG. 10 is a block diagram of a communication apparatus according to an embodiment.

FIG. 10 is a block diagram of a communication apparatus according to an embodiment. Referring to FIG. 10, the communication apparatus 300 is applied to a network device, and includes a processing unit 301 and a sending unit 302.

The processing unit 301 is configured to determine an offset of a communication parameter and a threshold of the communication parameter. The sending unit 302 is configured to send the offset of the communication parameter and the threshold of the communication parameter.

In an implementation, the offset of the communication parameter corresponds to a first-type terminal, and the threshold of the communication parameter corresponds to a second-type terminal. The offset of the communication parameter is determined based on a minimum communication parameter measurement value of the first-type terminal allowed to access the network device. The minimum communication parameter measurement value is configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the processing unit 301 is configured to determine the offset of the communication parameter and the threshold of the communication parameter through configuration information of RMSI, and the configuration information of the RMSI includes an offset information field used to indicate the offset of the communication parameter.

Figure 11:
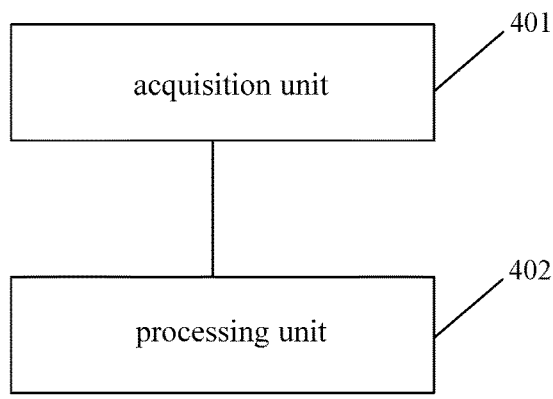
FIG. 11 is a block diagram of a communication apparatus according to an embodiment.

FIG. 11 is a block diagram of a communication apparatus according to an embodiment. Referring to FIG. 11, the communication apparatus 400 is applied to a terminal. The communication apparatus includes:

an acquisition unit 401 configured to acquire an offset of a communication parameter and a threshold of the communication parameter; and a processing unit 402 configured to conduct communication based on a measurement value of the communication parameter, the offset of the communication parameter, and the threshold of the communication parameter.

In an implementation, the offset of the communication parameter corresponds to a first-type terminal, and the threshold of the communication parameter corresponds to a second-type terminal. The offset of the communication parameter is determined based on a minimum communication parameter measurement value of the first-type terminal allowed to access a network device. The minimum communication parameter measurement value is configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the processing unit 402 conducts communication based on a measurement value of the communication parameter, the offset of the communication parameter, and the threshold of the communication parameter in the following manner:

determining that the terminal is prohibited from accessing a network in case that a sum of the measurement value of the communication parameter and the offset of the communication parameter is less than the threshold of the communication parameter; and determining that the terminal is allowed to access the network in case that the sum of the measurement value of the communication parameter and the offset of the communication parameter is greater than the threshold of the communication parameter.

In an implementation, the communication parameter includes RSRP.

In an implementation, the acquisition unit 401 acquires the offset of the communication parameter through configuration information of RMSI, and the configuration information of the RMSI includes an offset information field used to indicate the offset of the communication parameter.

Figure 12:
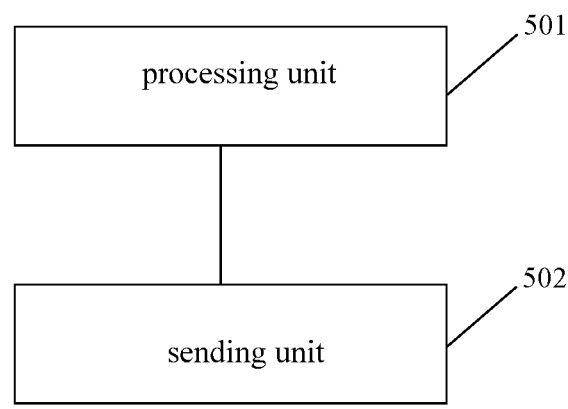
FIG. 12 is a block diagram of a communication apparatus according to an embodiment.

FIG. 12 is a block diagram of a communication apparatus according to an embodiment. Referring to FIG. 12, the communication apparatus 500 is applied to a network device, and includes a processing unit 501 and a sending unit 502.

The processing unit 501 is configured to determine a merging parameter value of a measurement value of a communication parameter and a threshold of the communication parameter, and the merging parameter value is used to determine, by a terminal, a measurement resource. The sending unit 502 is configured to send the merging parameter value and the threshold of the communication parameter.

In an implementation, the merging parameter value corresponds to a first-type terminal, and the threshold of the communication parameter corresponds to a second-type terminal. The merging parameter value is determined based on an average measurement value of the first-type terminal allowed to access the network device. The average measurement value is configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the communication parameter includes RSRP.

In an implementation, the merging parameter value is carried by configuration information of RMSI; or the merging parameter value is predefined.

Figure 13:
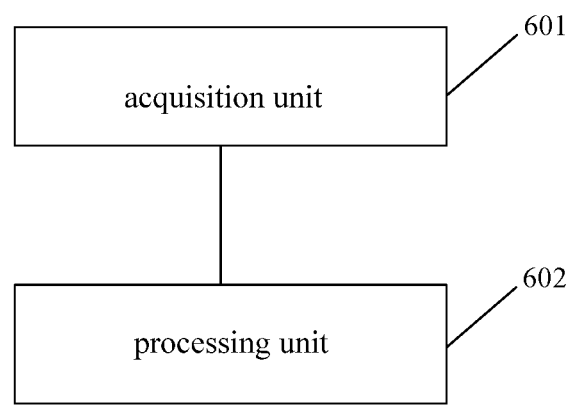
FIG. 13 is a block diagram of a communication apparatus according to an embodiment.

FIG. 13 is a block diagram of a communication apparatus according to an embodiment. Referring to FIG. 13, the communication apparatus 600 is applied to a terminal, and includes an acquisition unit 601 and a processing unit 602.

The acquisition unit 601 is configured to acquire a threshold of a communication parameter and a merging parameter value of a measurement value of the communication parameter. The processing unit 602 is configured to determine a measurement resource according to the merging parameter value, merge measurement values on the measurement resource, and conduct communication based on a merged measurement value and the threshold of the communication parameter.

In an implementation, the merging parameter value corresponds to a first-type terminal, and the threshold of the communication parameter corresponds to a second-type terminal. The merging parameter value is determined based on an average measurement value of the first-type terminal allowed to access a network device. The average measurement value is configured by the network device.

In an implementation, a capability of the first-type terminal is lower than a capability of the second-type terminal.

In an implementation, the capability includes one or more of a terminal transceiver bandwidth, a number of transceiver antennas, a maximum number of bits in a transport block, and a processing time delay.

In an implementation, the processing unit 602 is configured to conduct communication based on a merged measurement value and the threshold of the communication parameter in the following manner:
  determining that the first-type terminal is prohibited from accessing a network in case that the merged measurement value is less than the threshold of the communication parameter; and determining that the first-type terminal is allowed to access the network in case that the merged measurement value is greater than the threshold of the communication parameter.

In an implementation, the communication parameter includes RSRP.

In an implementation, the merging parameter value is carried by configuration information of RMSI; or the merging parameter value is predefined.

Regarding the apparatuses in the above embodiments, specific manners in which the modules perform operations have been described in details in the embodiments of the related methods, and will not be elaborated herein.

Figure 14:
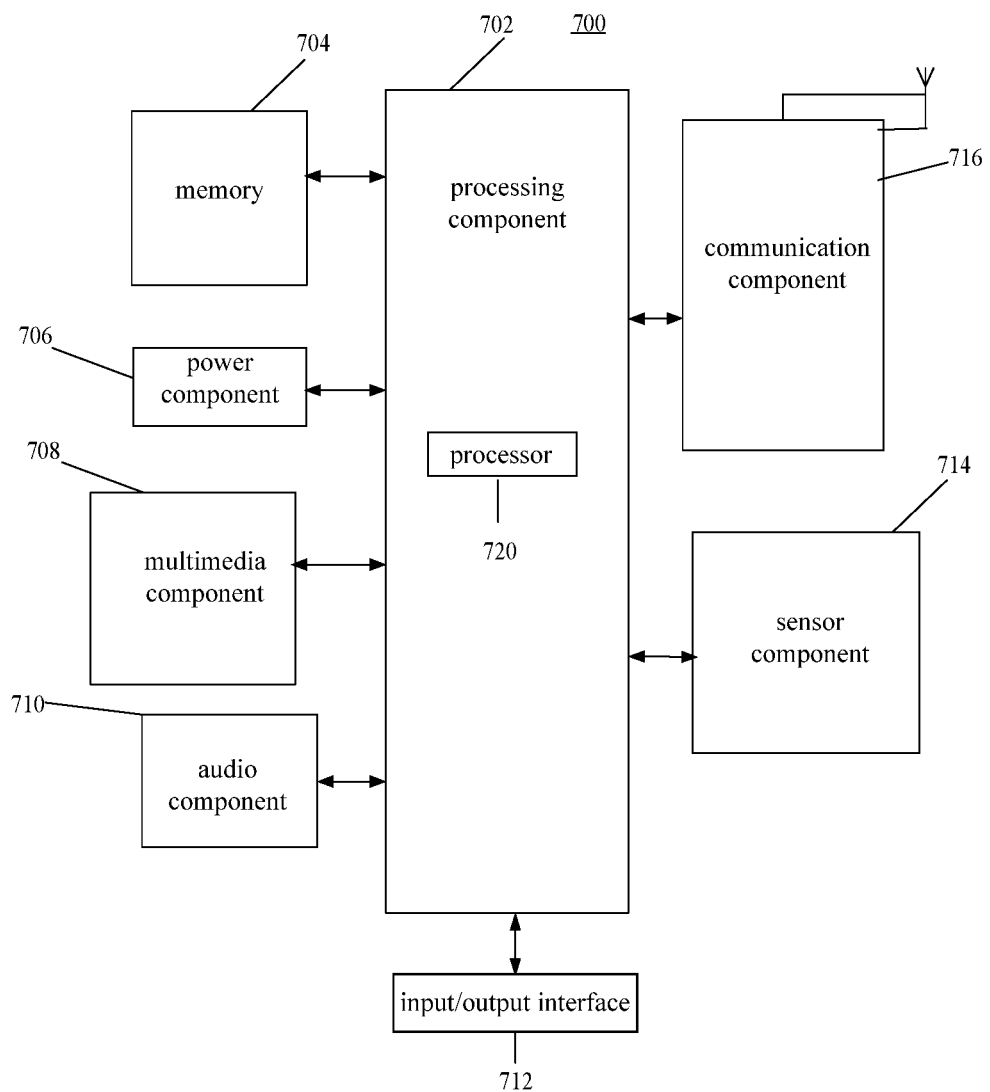
FIG. 14 is a block diagram of an apparatus for communication according to an embodiment.

FIG. 14 is a block diagram of an apparatus 700 for communication according to an embodiment. For example, the apparatus 700 may be a mobile phone, a computer, a digital broadcast terminal, a message transceiver device, a game console, a tablet device, medical equipment, fitness equipment, a personal digital assistant, or the like.

Referring to FIG. 14, the apparatus 700 may include one or more following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as operations associated with display, telephone calls, data communication, camera operations, and recording operations. The processing component 702 may include one or more processors 720 to execute instructions to perform all or some of the steps in the methods described above. In addition, the processing component 702 may include one or more modules which facilitate interaction between the processing component 702 and other components. For example, the processing component 702 may include a multimedia module to facilitate interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The power component 706 provides power to various components of the apparatus 700. The power component 706 may include a power management system, one or more power sources, and any other components associated with generation, management, and distribution of power in the apparatus 700.

The multimedia component 708 includes a screen providing an output interface between the apparatus 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense duration and a pressure associated with the touch or swipe action. In some embodiments, the multimedia component 708 includes a front camera and/or a rear camera. The front camera and/or the rear camera may receive external multimedia data while the apparatus 700 is in an operation mode, such as a photographing mode or a video mode. Each of the front camera and the rear camera may be a fixed optical lens system or have a focal length and optical zoom capability.

The audio component 710 is configured to output and/or input audio signals. For example, the audio component 710 includes a microphone (MIC) configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker configured to output audio signals.

The I/O interface 712 provides an interface between the processing component 702 and a peripheral interface module. The peripheral interface module may be a keyboard, a click wheel, buttons, or the like. The buttons may include, but are not limited to, a home button, a volume button, a starting button, and a locking button.

The sensor component 714 includes one or more sensors configured to provide state assessments of various aspects of the apparatus 700. For example, the sensor component 714 may detect an on/off state of the apparatus 700 and relative positioning of components. For example, the components may be a display and a keypad of the apparatus 700. The sensor component 714 may further detect a change in the position of the apparatus 700 or a component of the apparatus 700, presence or absence of the user's contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor or a temperature sensor.

The communication component 716 is configured to facilitate wired or wireless communication between the apparatus 700 and other devices. The apparatus 700 may access a wireless network based on a communication standard, such as WiFi, 2G or 3G, or a combination thereof. In an embodiment, the communication component 716 receives a broadcast signal or broadcast related information from an external broadcast management system via a broadcast channel. In an embodiment, the communication component 716 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic elements, for performing the above methods.

In embodiments, a non-transitory computer-readable storage medium including instructions, for example, a memory 704 including instructions, is further included. The instructions may be performed by a processor 720 of the apparatus 700 to complete the above method. For example, the non-transitory computer-readable storage medium may be a ROM, a RAM, a CD-ROM, a magnetic tape, a floppy disc, an optical data storage device or the like.

Figure 15:
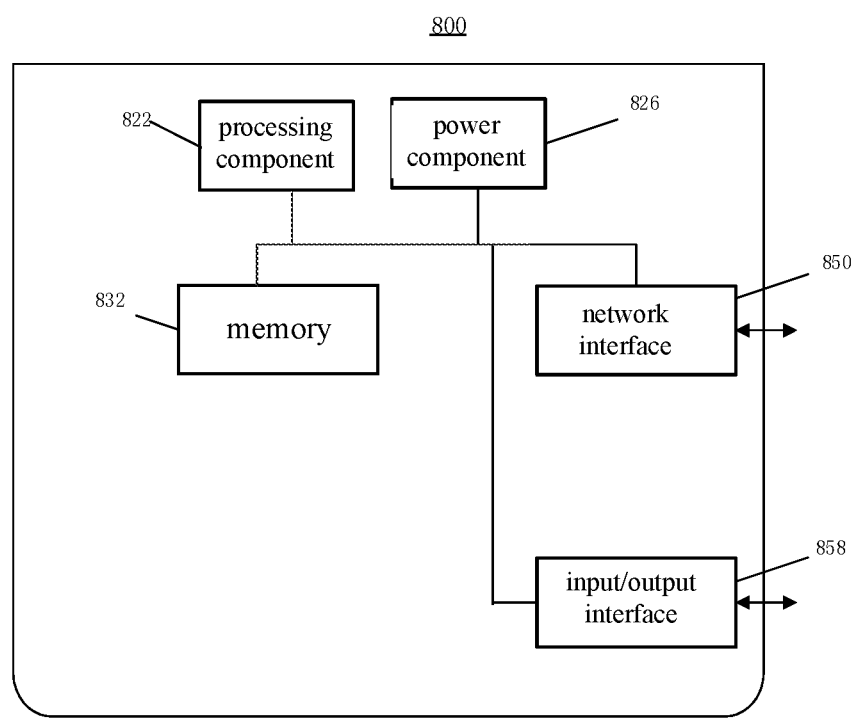
FIG. 15 is a block diagram of an apparatus for communication according to an embodiment.

FIG. 15 is a block diagram of an apparatus 800 for communication according to an embodiment. For example, the apparatus 800 may be provided as a server. Referring to FIG. 8, the apparatus 800 includes a processing component 822 further including one or more processors, and a memory resource represented by a memory 832 for storing instructions, such as an application program, executable by the processing component 822. The application program stored in the memory 832 may include one or more modules each corresponding to a set of instructions. In addition, the processing component 822 is configured to execute the instructions to execute the above method . . . .

The apparatus 800 may further include a power component 826 configured to execute power management of the apparatus 800, a wired or wireless network interface 850 configured to connect the apparatus 800 to a network, and an I/O interface 858. The apparatus 800 may be operated based on an operating system stored in the memory 832, for example, Windows Server™, Mac OS X™, Unix™, Linux™, FreeBSD™ or the like.

In embodiments, a non-transitory computer-readable storage medium including instructions, for example, a memory 832 including instructions, is further included. The instructions may be performed by a processor 822 of the apparatus 800 to complete the above method. For example, the non-transitory computer-readable storage medium may be a ROM, a RAM, a CD-ROM, a magnetic tape, a floppy disc, an optical data storage device or the like.

It may be further understood that "a plurality of" in the present disclosure indicates two or more, and other quantifiers are similar thereto. The term "and/or" describes an association relationship of associated objects, indicating that three relationships may exist. For example, A and/or B may represent the following three cases: Only A exists, both A and B exist, and only B exists. The character "/" generally indicates that the associated objects before and after are in an "or" relationship. The singular forms "a/an", "said", and "the" are also intended to include plural forms, unless otherwise clearly specified in the context.

It may be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" may be used interchangeably. For example, without departing from the scope of the present disclosure, the first information may also be referred to as second information, and similarly, the second information may also be referred to as first information.

It may be further understood that, although the operations are described in a specific order in the drawings in the embodiments of the present disclosure, it should not be understood that the operations are required to be performed in the shown specific order or in a serial order, or all the shown operations are required to be performed to get a desired result. In specific circumstances, multitasking and parallel processing may be advantageous.

Those skilled in the art will be aware of other embodiments of the present disclosure after considering the specification and practicing the invention disclosed herein. The present application is intended to cover any variations, uses, or adaptive changes of the present disclosure, which follow the general principles of the present disclosure and include common knowledge or conventional technical means in the technical field not disclosed in the present disclosure. The specification and the embodiments are to be regarded as illustrative only, and the true scope and spirit of the present disclosure are indicated in the following claims.

It may be appreciated that the present disclosure is not limited to the exact construction that has been described above and illustrated in the accompanying drawings, and that various modifications and changes may be made without departing from the scope thereof. The scope of the present disclosure is only limited by the appended claims.

What is claimed is:

1. A communication method, performed by a network device, comprising:
   determining an offset of a communication parameter and a threshold of the communication parameter, wherein the offset of the communication parameter corresponds to a first-type terminal, and the threshold of the communication parameter corresponds to a second-type terminal; a capability of the first-type terminal is lower than a capability of the second-type terminal; the offset of the communication parameter is determined based on a minimum communication parameter measurement value of the first-type terminal allowed to access the network device; a sum of the minimum communication parameter measurement value of the terminal allowed to access and the offset of the communication parameter is greater than the threshold of the communication parameter; and
   sending the offset of the communication parameter and the threshold of the communication parameter.

2. The communication method according to claim 1, wherein the minimum communication parameter measurement value being configured by the network device.

3. The communication method according to claim 1, wherein the capability comprises one or more of a terminal transceiver bandwidth, a number of transceiver antennas, a maximum number of bits in a transport block, and a processing time delay.

4. The communication method according to claim 1, wherein the communication parameter comprises reference signal received power (RSRP).

5. The communication method according to claim 4, wherein determining an offset of a communication parameter and a threshold of the communication parameter, comprises:
   determining the offset of the communication parameter and the threshold of the communication parameter through configuration information of remaining minimum system information (RMSI), the configuration information of the RMSI comprising an offset information field configured to indicate the offset of the communication parameter.

6. A communication method, performed by a terminal, the communication method comprising:
   acquiring an offset of a communication parameter and a threshold of the communication parameter, wherein the offset of the communication parameter corresponds to a first-type terminal, and the threshold of the communication parameter corresponds to a second-type terminal; a capability of the first-type terminal is lower than a capability of the second-type terminal; the offset of the communication parameter is determined based on a minimum communication parameter measurement value of the first-type terminal allowed to access the network device; a sum of the minimum communication parameter measurement value of the terminal allowed to access and the offset of the communication parameter is greater than the threshold of the communication parameter; and
   conducting communication based on a measurement value of the communication parameter, the offset of the communication parameter, and the threshold of the communication parameter.

7. The communication method according to claim 6, wherein the minimum communication parameter measurement value being configured by the network device.

8. The communication method according to claim 6, wherein the capability comprises one or more of a terminal transceiver bandwidth, a number of transceiver antennas, a maximum number of bits in a transport block, and a processing time delay.

9. The communication method according to claim 6, wherein conducting communication based on a measurement value of the communication parameter, the offset of the communication parameter, and the threshold of the communication parameter, comprises:
   determining that the terminal is prohibited from accessing a network in case that a sum of the measurement value of the communication parameter and the offset of the communication parameter is less than the threshold of the communication parameter; and
   determining that the terminal is allowed to access the network in case that the sum of the measurement value of the communication parameter and the offset of the communication parameter is greater than the threshold of the communication parameter.

10. The communication method according to claim 6, wherein the communication parameter comprises RSRP.

11. The communication method according to claim 6, wherein acquiring an offset of a communication parameter, comprises:
    acquiring the offset of the communication parameter through configuration information of RMSI, the configuration information of the RMSI comprising an offset information field configured to indicate the offset of the communication parameter.

12. A communication apparatus for a terminal, comprising:
    a processor; and
    a memory configured to store processor-executable instructions;
    wherein the processor is configured to perform a communication method according to claim 6.

13. A communication apparatus for a network device, comprising:
    a processor; and
    a memory configured to store processor-executable instructions;
    wherein the processor is configured to:
    determine an offset of a communication parameter and a threshold of the communication parameter, wherein the offset of the communication parameter corresponds to a first-type terminal, and the threshold of the communication parameter corresponds to a second-type terminal; a capability of the first-type terminal is lower than a capability of the second-type terminal; the offset of the communication parameter is determined based on a minimum communication parameter measurement value of the first-type terminal allowed to access the network device; a sum of the minimum communication parameter measurement value of the terminal allowed to access and the offset of the communication parameter is greater than the threshold of the communication parameter; and send the offset of the communication parameter and the threshold of the communication parameter.

14. The communication apparatus according to claim 13, wherein the minimum communication parameter measurement value being configured by the network device.

15. The communication apparatus according to claim 13, wherein the capability comprises one or more of a terminal transceiver bandwidth, a number of transceiver antennas, a maximum number of bits in a transport block, and a processing time delay.

16. The communication apparatus according to claim 13, wherein the communication parameter comprises reference signal received power (RSRP).

17. The communication apparatus according to claim 16, wherein the processor is configured to:

determine the offset of the communication parameter and the threshold of the communication parameter through configuration information of remaining minimum system information (RMSI), the configuration information of the RMSI comprising an offset information field configured to indicate the offset of the communication parameter.

* * * * *